United States Patent
Cluett

[11] Patent Number: 5,799,684
[45] Date of Patent: Sep. 1, 1998

[54] FRANGIBLE HYDRAULIC FUSE

[75] Inventor: George B. Cluett, Brooklyn, Mich.

[73] Assignee: Aeroquip Corporation, Maumee, Ohio

[21] Appl. No.: 649,127

[22] Filed: May 14, 1996

[51] Int. Cl.$^6$ ............................................. F16K 17/40
[52] U.S. Cl. .................... 137/68.15; 137/71; 137/460;
   137/498; 244/129.1; 244/135 R
[58] Field of Search ...................... 137/68.14, 68.15,
   137/71, 460, 498; 244/129.1, 135 R

[56] References Cited

U.S. PATENT DOCUMENTS

| | | | |
|---|---|---|---|
| 2,093,015 | 9/1937 | Madden | 303/84 |
| 2,411,392 | 11/1946 | Saville | 137/498 |
| 2,635,629 | 4/1953 | Asaro | 137/460 X |
| 2,666,656 | 1/1954 | Bruning | 244/129.1 X |
| 2,821,209 | 1/1958 | Waterman | 137/498 |
| 2,960,109 | 11/1960 | Wilson | 137/517 |
| 3,036,593 | 5/1962 | Saville | 137/469 |
| 3,159,167 | 12/1964 | Mueller et al. | 137/71 |
| 3,228,658 | 1/1966 | London | 254/93 |
| 3,494,375 | 2/1970 | Henaughan | 137/599 |
| 3,741,241 | 6/1973 | Jackson | 137/504 |
| 3,741,521 | 6/1973 | Tatsuno | 137/68.15 |
| 4,341,235 | 7/1982 | Nord | 137/312 |
| 4,347,867 | 9/1982 | Peters | 137/460 |
| 4,383,549 | 5/1983 | Maldays | 137/514.7 |
| 4,436,111 | 3/1984 | Gold et al. | 137/498 |
| 4,465,093 | 8/1984 | Gold et al. | 137/498 |
| 4,605,039 | 8/1986 | Johnson et al. | 137/460 |
| 4,655,245 | 4/1987 | Gellerson | 137/493 |
| 4,665,942 | 5/1987 | Altman | 137/490 |
| 4,699,166 | 10/1987 | Gold et al. | 137/2 |
| 4,762,140 | 8/1988 | Davis | 137/71 |
| 4,785,847 | 11/1988 | Steer et al. | 137/505.25 |
| 4,819,688 | 4/1989 | Field | 137/493.6 |
| 4,867,198 | 9/1989 | Faust | 137/503 |
| 4,870,889 | 10/1989 | Wall | 91/49 |
| 4,962,786 | 10/1990 | Gellerson | 137/493.6 |
| 5,107,679 | 4/1992 | Bartlett | 60/481 |
| 5,137,054 | 8/1992 | Harper | 137/614.19 |
| 5,379,797 | 1/1995 | Rogers et al. | 137/503 |

FOREIGN PATENT DOCUMENTS

| | | | |
|---|---|---|---|
| 2334634 | 2/1974 | Germany | 137/503 |
| 603812 | 6/1948 | United Kingdom | 137/503 |

OTHER PUBLICATIONS

Department of Defense Military Specification Sheet No. M533514G dated 21, May 1990.

*Primary Examiner*—Stephen M. Hepperle
*Attorney, Agent, or Firm*—Emch, Schaffer, Schaub & Porcello, Co., L.P.A.

[57] ABSTRACT

A frangible hydraulic fuse includes a fitting secured to a sleeve by a plurality of frangible pins. In normal operation, hydraulic fluid flows through the fuse through radial ports of a sleeve to which the fitting is engaged by the frangible pins. A compression spring urges a poppet slideably positioned in the sleeve to a position out of engagement with the radial ports. Upon rupture of the frangible pins, the fitting is released and hydraulic fluid may flow unimpeded through the radial ports creating a pressure drop which causes the slideable poppet to move to a position overlying and closing the radial ports.

34 Claims, 8 Drawing Sheets

FIG 8

FRANGIBLE HYDRAULIC FUSE

BACKGROUND OF THE INVENTION

The present invention relates to a frangible hydraulic fuse which permits the flow of fluid therethrough but which automatically closes when the flow rate of the fluid flowing therethrough exceeds a predetermined level. The frangible hydraulic fuse of the present invention is particularly useful in aircraft, for example, and is preferably positioned near the wing tip or other area particularly susceptible to damage from collision.

In the event of collision or other structural failure of the wing tip in an area of the hydraulic system downstream from the frangible hydraulic fuse, the wing tip and that portion of the hydraulic fluid flow system in that area may be totally separated from the remainder of the aircraft. Unless a fuse or other means are provided for stopping the flow of hydraulic fluid from the damage system, the aircraft could lose so much hydraulic fluid as to render the associated hydraulic system inoperative, possibly leading to loss of control of the aircraft. Although fuses have been used in the past for the express purpose of preventing loss of hydraulic fluid in the event of such a collision, the prior art devices used in such aircraft were not frangible. As a result, upon breakage of the hydraulic fluid line upon a collision, there was not necessarily a clean break. In instances where breakage of the fluid flow line downstream from the prior art hydraulic fuses was not clean, there existed the possibility that the flow of hydraulic fluid through the ruptured line could be impeded and would not permit a sufficiently rapid flow of the escaping hydraulic fluid to set the fuse and close it to the flow of hydraulic fluid. As a result, a great quantities of hydraulic fluid could be lost through the rupture with disastrous results in loss of control of the aircraft.

The prior art includes a number of types of hydraulic fuses, some of which may be characterized as rate fuses which close or at least impede the flow of fluid when the flow rate exceeds a predetermined level and others of which may be characterized as quantity fuses under which the fuse will serve to impede the flow of fluid after a predetermined quantity of fluid flows therethrough. The present invention is directed to the former type which is sensitive to the flow rate of the fluid. Examples of prior art hydraulic fuses are included in the following U.S. Pat. Nos.: 3,494,375; 3,741, 241; 4,383,549; 4,436,111; 4,465,093; 4,655,245; 4,665, 942,4,699,166; 4,819,688; 4,962,786; 5,137,054 and 5,379, 797.

Military Specifications adopted by the U.S. Department of Defense establish performance requirements for various components and systems of military aircraft. Military Specification MIL-F-18280-E establishes requirements for fittings, flareless tube and fluid connection components, including at Paragraph 3.6.6 a requirement that flareless tube fittings meet a specified minimum joint strength for a particular size. For example, for a –6 size (⅜" O.D.) of a specified type, the minimum joint strength is established to be 2500 pounds.

DISCLOSURE OF THE INVENTION

Under the present invention the fuse is placed in the hydraulic system, for example, in the wing of an aircraft near the tip in an area in which a portion of the hydraulic system fluid flow line lies downstream from the frangible hydraulic fuse of the present invention. The fuse is provided with frangible pins securing a fitting at the outlet end to the body. During operation of the fluid flow line, the fuse permits fluid to flow directly therethrough so long as the flow rate does not exceed a predetermined level. If the flow rate reaches a predetermined level, such as would occur upon collision or other reason for failure of the fluid flow line downstream from the frangible hydraulic fuse, the increase in flow rate of hydraulic fluid through the fuse will cause the fuse to close stopping the flow of fluid.

The frangible hydraulic fuse of the present invention is designed such that the frangible pins will fail when the tension on one end of the fuse relative to the other end exceeds two-thirds (⅔s) of the minimum joint strength established pursuant to Military Specification MIL-F-18280E for the size in question, for example, two-thirds of 2500 pounds for the –6 size. Upon failure of the frangible pins, the fitting portion of the fuse is pulled cleanly out of the fuse body member thereby permitting a rapid flow of hydraulic fluid which actuates the fuse, stopping flow of hydraulic fluid and preserving the associated hydraulic system upstream therefrom.

BEST MODE OF CARRYING OUT INVENTION

Referring now to the drawings, the frangible fuse of the present invention includes a body member 10 which extends along an axis A from an inlet end 11 to an outlet end 12 with an axial passageway 13 extending throughout. The inlet end 11 includes external threads 14 for engaging the body member to a hydraulic fluid flow line 9 such as that utilized in an airplane. The body member 10 includes an enlarged cylindrical section 15 downstream from the externally threaded section 14 and a reduced size cylindrical section 16 extending from the enlarged cylindrical section 15 to the outlet end 12. The reduced sized cylindrical section 16 includes inwardly facing threads 17 immediately adjacent the enlarged cylindrical section 15 followed by a slightly larger first inwardly facing cylindrical wall 18 and a slightly larger second inwardly facing cylindrical wall 19 which extends from the first inwardly facing cylindrical wall 18 to the outlet end 12. The body member 10 has a pair of integrally formed ears 28 each having an aperture 29 for receiving a screw, rivet or other means for securely fastening the body member 10 to a structural member of the aircraft.

A sleeve 20 is threadedly engaged to the threads 17 of the reduced size cylindrical section 16 of the body member and extends from a forward end 21 positioned in the enlarged cylindrical section 15 to a rearward end 22 axially aligned with the outlet end 12 of body member 10. The sleeve 20 includes an axial passageway 23 which extends from the forward end 21 to the rearward end 22 and a plurality, preferably four, of metering holes 24 extending radially outwardly to the enlarged cylindrical section in an area approximately midway axially between the forward end 21 and rearward end 22. For the −6 size, the metering holes will each have a diameter on the order of 0.156 inch. The sleeve 20 is provided with inwardly facing threads 25 adjacent the forward end 21 and an annular groove 26 on the opposite side of the threads 25 from the forward end 21. An O-ring 27 is positioned in the annular groove 26.

A plug 30 is threadedly engaged to the threads 25. The plug 30 has an end wall 31 tapering at an angle defining a frustum of cone and an axially positioned communication port 32 defining an opening on the order of 0.030 inch. The end wall 31 extends outwardly radially beyond the threads 25 forming a shoulder which engages the forward end 21 when the plug 30 is fully engaged to the sleeve 20. When the plug 30 is thus fully engaged, its outer wall adjacent the end opposite the end wall 31 is sealingly engaged to the O-ring 27.

The axial portion of the sleeve 20 between the annular groove 26 to an area just beyond the radial metering holes 24 defines a first inwardly facing cylindrical surface 33 followed by a second inwardly facing cylindrical surface 34 of smaller size with a radially inwardly directed shoulder 35 therebetween.

Figure 5:
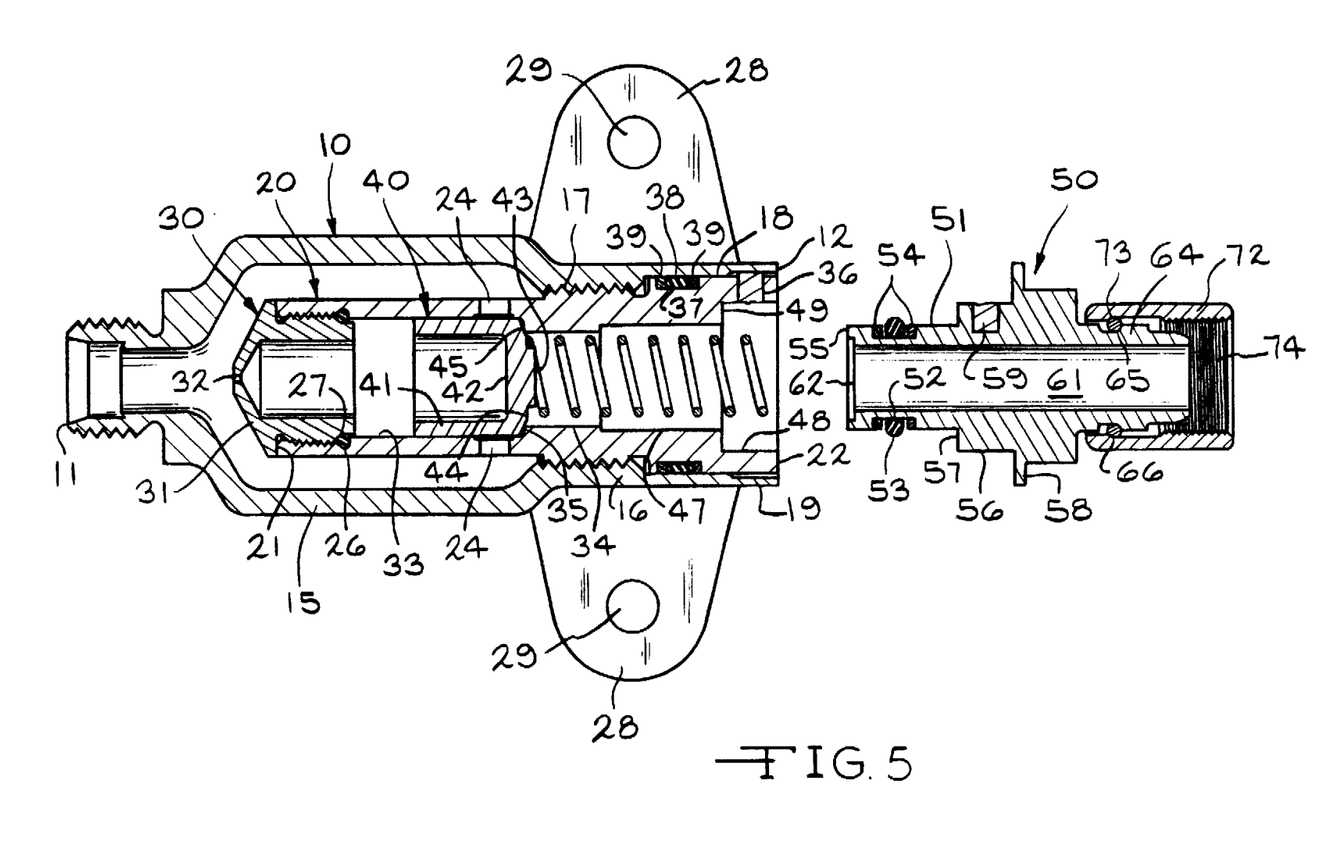
FIG. 5 is a view similar to FIG. 4 but showing the fuse moved to the fully closed position.

Positioned in the portion of the sleeve 20 between the plug 30 and the radial shoulder 35 is a poppet 40. The poppet 40 includes a cylindrical side wall 41 having a size to be slideably engaged to the first inwardly facing cylindrical surface 33 of the sleeve 20 and a laterally extending end wall 42 having an axially positioned nose portion 43, an annular flat surface 44 generally perpendicular to the axis A and a conical surface 45 extending from the flat surface 44 to the outer surface of the cylindrical side wall 41. The poppet 40 has an axial length such that, when it is engaged to the plug 30, it is spaced from the metering holes 24 so that the metering holes are open to the flow of hydraulic fluid. The poppet 40 can slide axially from the normally open position at which the open end of the cylindrical side wall 41 is engaged to the plug 30 (see FIG. 2) to the closed position (see FIG. 5) at which the conical surface 45 engages the shoulder 35 thus limiting further forward movement of the poppet 40. As can be seen in FIG. 5, when the poppet 40 is in such closed position with the conical surface 45 engaging the shoulder 35, the cylindrical side wall 41 overlies the metering holes 24 thereby preventing the flow of hydraulic fluid therethrough.

The sleeve 20 is provided with three radial apertures 36 adjacent the rearward end 22 and an outwardly facing annular groove 37 in which is positioned an annular sealing ring 38 and the pair of rigid plastic anti-extrusion rings 39, one on each side of the annular sealing ring 38. The annular sealing ring 38 is sealingly engaged to the first inwardly facing cylindrical wall 18 of the body member 10.

Internally, the sleeve 20 is provided with a third inwardly facing cylindrical surface 47 having a diameter larger than the second inwardly facing cylindrical surface 34 and adjacent thereto and a fourth inwardly facing cylindrical surface 48 adjacent to and having yet a larger diameter than the third inwardly facing cylindrical surface 47. The fourth inwardly facing cylindrical surface 48 extends to the rearward end 22. A radial shoulder 49 extends between the third inwardly facing cylindrical surface 47 and fourth inwardly facing cylindrical surface 48. The apertures 36 extend through such fourth inwardly facing cylindrical surface 48.

Positioned in the rearward end 22 of the sleeve 20 is a fitting 50 having a central passageway 61 extending throughout and a nose portion 51 with an outer diameter slightly less than the diameter of the third inwardly facing cylindrical surface 47 and larger than the diameter of the second inwardly facing cylindrical surface 34 of the sleeve 20. The nose portion 51 has an outwardly facing annular groove 52 in which is positioned an annular seal ring 53 and a pair of rigid plastic anti-extrusion rings 54. The annular seal ring 53 is sized to sealingly engage the third inwardly facing cylindrical surface 47 of the sleeve 20. The nose 51 extends from a first end 55 of the fitting 50 to an enlarged cylindrical wall portion 56 having a radial shoulder 57 therebetween. The first end 55 of the fitting 50 is provided with a central recess 62. An annular flange 58 extends radially outwardly from the enlarged cylindrical wall 56 on the opposite side thereof from the radial shoulder 57.

Figure 1:
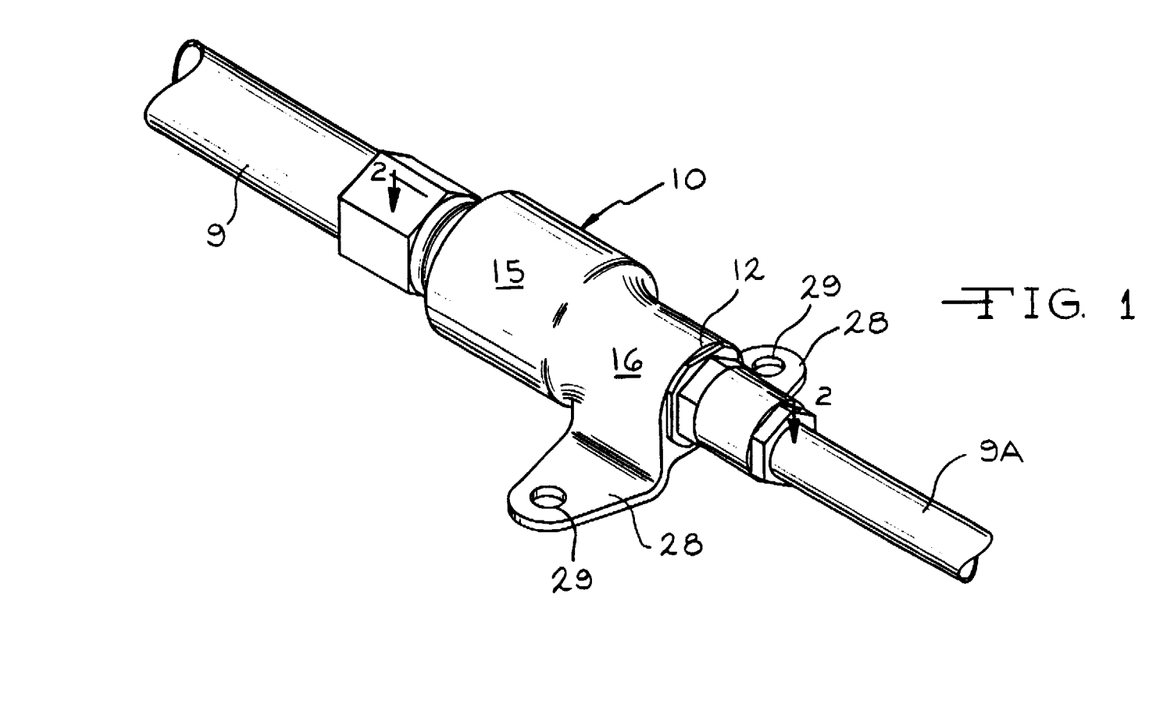
FIG. 1 is a perspective view of the frangible hydraulic fuse of the present invention installed in a fluid flow line.
Figure 2:
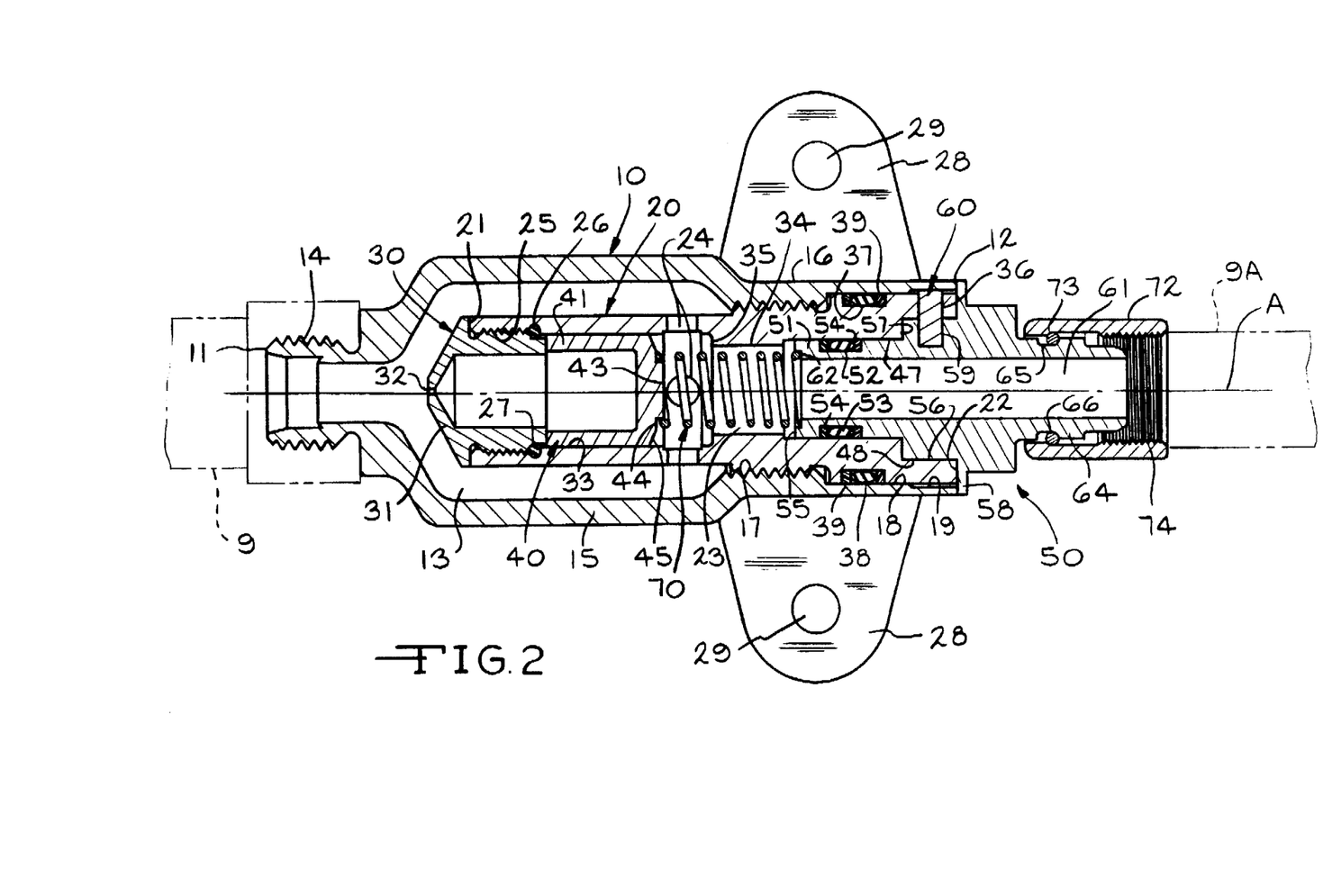
FIG. 2 is a sectional view taken though line 2—2 of FIG. 1 showing the frangible hydraulic fuse of the present invention in the normal open position permitting the flow of hydraulic fluid.
Figure 3:
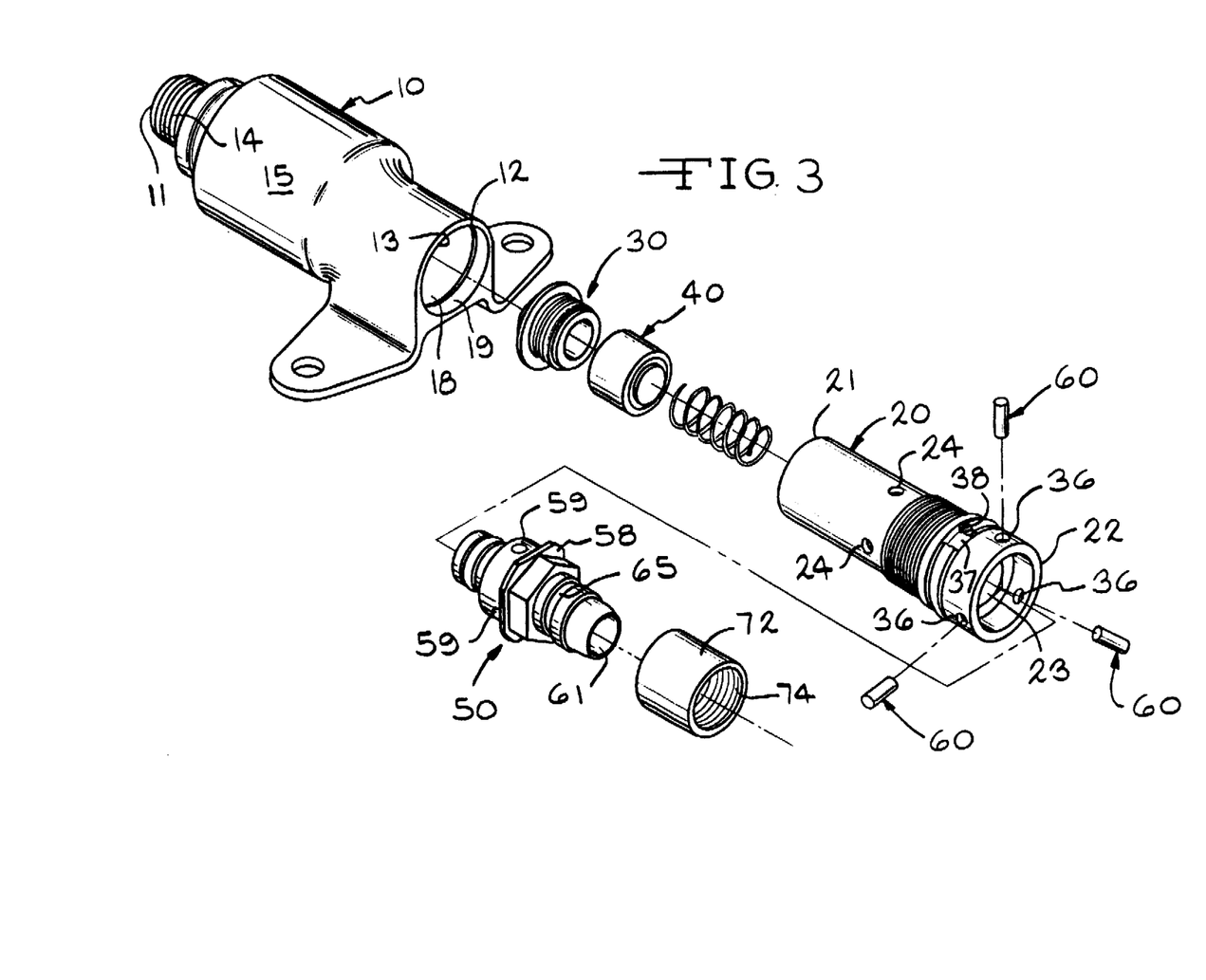
FIG. 3 is an exploded perspective view of the frangible hydraulic fuse of the present invention.
Figure 4:
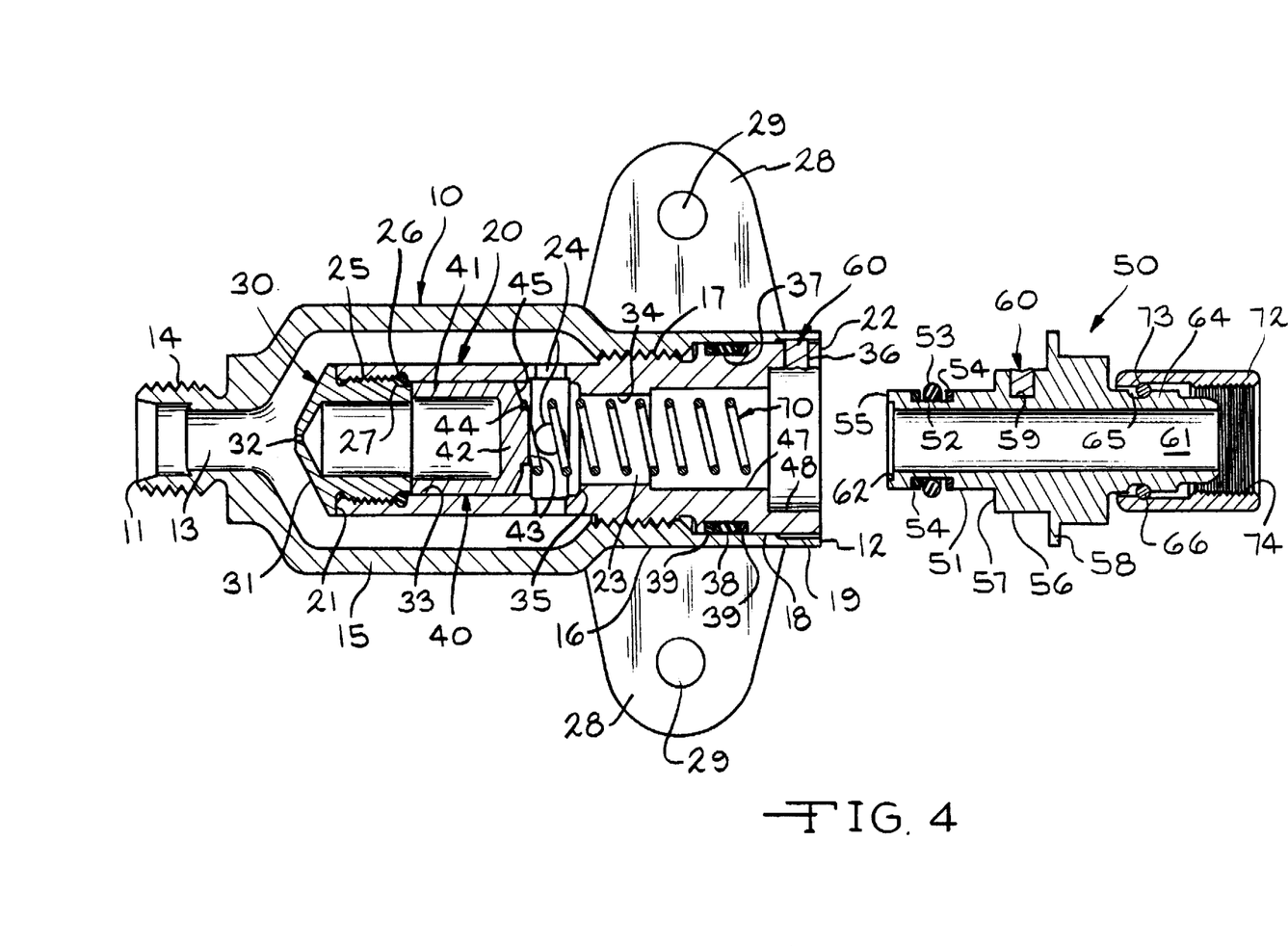
FIG. 4 is a view similar to FIG. 2 showing the positioning of the parts immediately after breakage of the fuse pins and separation of the fitting from the body but before the fuse has had time to react to the increase in flow rate and move to the close position.

As can be seen particularly in FIG. 2, when the fitting 50 is positioned in the sleeve 20, the radial shoulder 57 will engage the shoulder of the sleeve between the third inwardly facing cylindrical surface 47 and the fourth inwardly facing cylindrical surface 48 and the annular flange 58 will engage the rearward end 22 of the sleeve 20 and the outlet end 12 of the body member 10.

The enlarged cylindrical wall 56 is provided with three cylindrical cavities 59 which, when the fitting 50 is fully inserted in the sleeve 20 as shown in FIG. 2, will be aligned with the apertures 36 of the sleeve 20. Each of the aligned cylindrical cavities 59 and apertures 36 receives therein a frangible pin 60 which is manufactured of a material which will break upon being subjected to a shear force exceeding a predetermined magnitude. The frangible pins 60 could, for example, be manufactured from a type 303C soft stainless steel per ASTM Standard A582. The frangible pins 60 thus function to retain the fitting 50 engaged to the sleeve 20 until shear forces on said pins 60 cause such pins to fail. In an airplane, such shear forces may be caused by an impact on the wing causing the hydraulic flow line downstream from the hydraulic fuse to be pulled away from the fuse with a force sufficient to cause the frangible pins 60 to fail. The hydraulic flow line may be pulled axially or at an acute angle to the axis. The body member 10 is prevented from moving as a result of such downstream axial pull of the hydraulic flow line as its integrally formed ears 28 are fastened to a structural member of the aircraft.

The fitting 50 further includes a connector end portion 64 having a groove 65 in which is positioned a shear wire 66 formed into a ring. A threaded sleeve 72 has an inwardly facing abutment 73 engaged to the shear wire 66 for retaining the threaded sleeve to the fitting 50 while permitting rotation thereof on the connector end 64. The sleeve 72 is provided with inwardly facing threads 74 for attachment to a hydraulic fluid flow line section 9A. Such hydraulic fluid flow line section 9A may have welded or otherwise suitably affixed thereto a threaded male member having a configuration such as that portion of the body member 10 extending from the inlet end 11 through the external threads 14.

Prior to inserting the fitting 50 into the sleeve 20, a compression spring 70 is positioned so as to extend between the flat surface 44 adjacent the nose 43 of the poppet 40 and the recess 62 adjacent the first end 55 of the fitting 50. The compression spring 70 acts to yieldingly urge the poppet 40 toward the plug 30 to the position shown in FIG. 2 thereby leaving the four metering holes 24 open to the flow of hydraulic fluid.

In operation, the frangible hydraulic fuse of the present invention is installed in the hydraulic fluid flow system of an airplane, normally in the vicinity of the wing tip, with the external threads 14 adjacent the inlet end being threadedly engaged to one fluid flow line 9 (shown in dashed lines in FIG. 2) of the hydraulic system and the threads 74 of the sleeve 72 engaging an opposing length of tubing 9A of such hydraulic system. As previously mentioned, the body member 10 is affixed to a structural member of the airplane by engagement of rivets, screws or other suitable fastening means engaging the ears 28 through the apertures 29. When so engaged to the hydraulic fluid flow line sections 9 and 9A, the hydraulic fluid, upon operation of the hydraulic system, will flow into the body member 10 through the inlet end 11, into that portion of the passageway between the body member enlarged cylindrical section 15 and the outer surface of the sleeve 20, through the radial metering holes 24 and into the portion of the sleeve defined by the second inwardly facing cylindrical surface 34. The hydraulic fluid will continue its flow along the axis A through the central passageway 61 of the fitting 50 and then into the connected length of tubing 9A. As will be appreciated, hydraulic fluid will also flow through the communication port 32 in the end wall 31 of the plug 30; however, no significant amount of hydraulic fluid flowing through the communication port 32 can escape to the metering holes 24.

The fuse is preferably positioned near the ends of the wings as this is the portion of the aircraft and, therefore, the hydraulic system which is most susceptible to damage. If and when the wing tip is damaged by collision with or impact of a foreign body, such impact will likely cause the length of tubing 9A connected to the threaded sleeve 72 to pull away, thereby imparting to the fitting 50 a sudden and wrenching movement in a generally axial or slightly angled direction away from the sleeve 20. Assuming the forces to which the fuse is subjected are sufficiently great, the frangible pins 60 will break as a result of the shear force imparted thereto by the sudden pulling away of the fitting 50 as the length of tubing 9A to which such fitting is connected is pulled away. Such breakage of the frangible pins 60 releases the fitting 50 from engagement with the sleeve 20 thus leaving a clean unobstructed opening defined by the third inwardly facing cylindrical surface 47 and fourth inwardly facing cylindrical surface 48, through which the hydraulic fluid may flow.

As will be appreciated, such unobstructed flow of hydraulic fluid through the metering holes 24, will cause a pressure drop to be developed across the metering holes 24 such that the pressure downstream of the metering holes 24 will be less than the pressure upstream. As a result of such pressure drop, the pressure from the hydraulic fluid captured within the poppet 40 through the communication port 32 is greater than the pressure on the opposite side of the poppet end wall 42. As a result of disengagement of the fitting 50 upon breakage of the frangible pins 60, the compression spring 70 is disengaged from contact at its end toward the outlet end 12 with the result that it is no longer placing an axial force urging the poppet 40 toward the inlet end. In the absence of any such spring imposed axial force toward the inlet end 11, the poppet 40 will be caused by the higher pressure developed through the communication port 32 to slide axially along the first inwardly facing cylindrical surface 33 toward the sleeve rearward end 22 to a position at which the conical surface 45 engages the shoulder 35 of the sleeve. When at this position, the poppet 40 overlies and closes the metering holes 24, thereby preventing further loss of hydraulic fluid and preserving the integrity of the hydraulic system, thereby permitting the pilot to maintain control of the aircraft.

Preferably, the metering hole 32 is fairly small, on the order of 0.030 inch, significantly smaller that the size of the metering holes 24. Such relatively small size for the metering hole 32 provides a delay feature which causes movement of the poppet 40 toward the sleeve rearward end 22 upon breaking of the frangible pins 60 and disengagement of the fitting 50 to be at a relatively slow rate. This precludes inadvertent setting of the fuse during transient surge flow conditions such as hydraulic system start-up.

Under one embodiment, the hydraulic fuse of the present invention is designed to be utilized in an aircraft hydraulic system having a normal operating pressure of 3000 psig with a minimum separation load under 3000 psig internal pressure of 950 pounds axial. In other words, with the internal pressure in the hydraulic system being 3000 psig, the frangible pins 60 are designed to fail when the fitting is subjected to an axial load of 950 pounds or more. The nominal fusing flow under this embodiment is 10 gallons per minute (gpm) with a maximum pressure drop of 20 psid (pounds per square inch differential) across the ports 24 at a flow rate of 7 gallons per minute (gpm). In other words, when the flow of hydraulic fluid through the ports 24 reaches 10 gpm following either a clean break in the power system hydraulic line or separation of the fitting 50 from the sleeve 20, the pressure drop thus created will cause the poppet 40 to slide axially in the sleeve 20 to a position at which the conical surface 45 engages the shoulder 35, at which position poppet 40 overlies and closes the metering holes 24.

Figure 6:
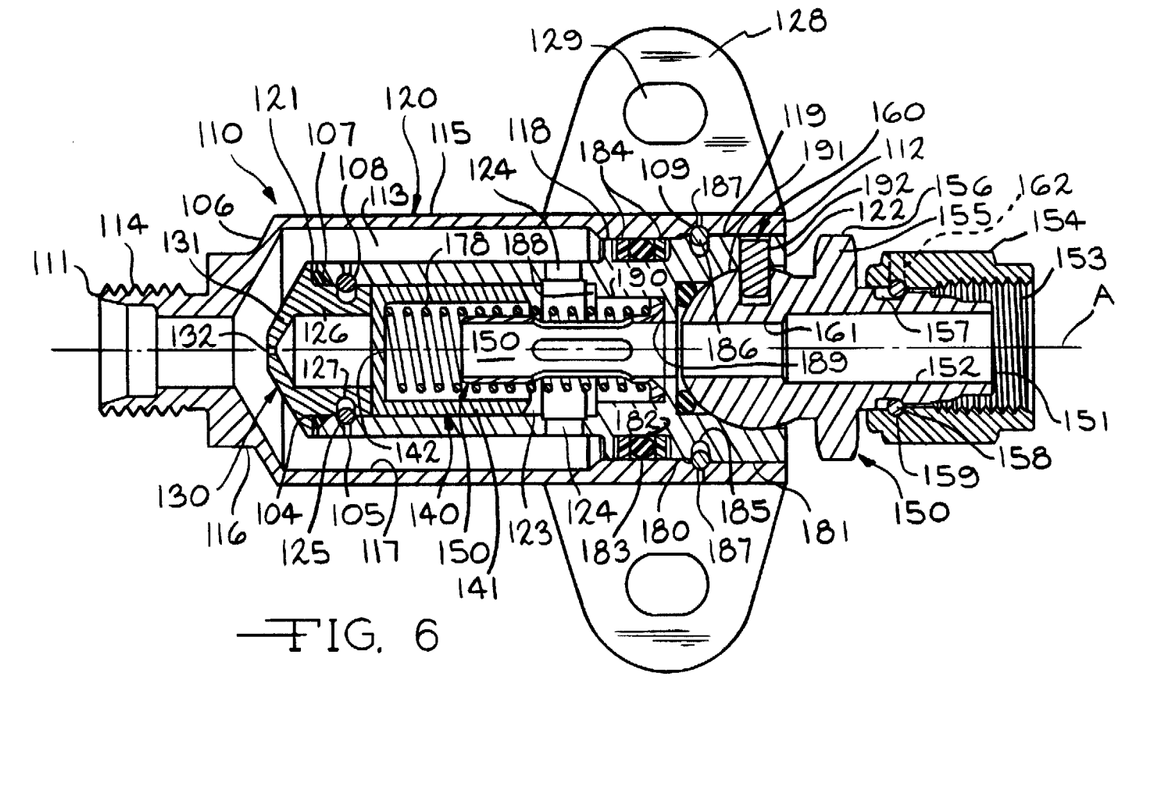
FIG. 6 is a sectional view of an alternate embodiment of hydraulic fuse in the normal open position permitting the flow of hydraulic fluid.
Figure 7:
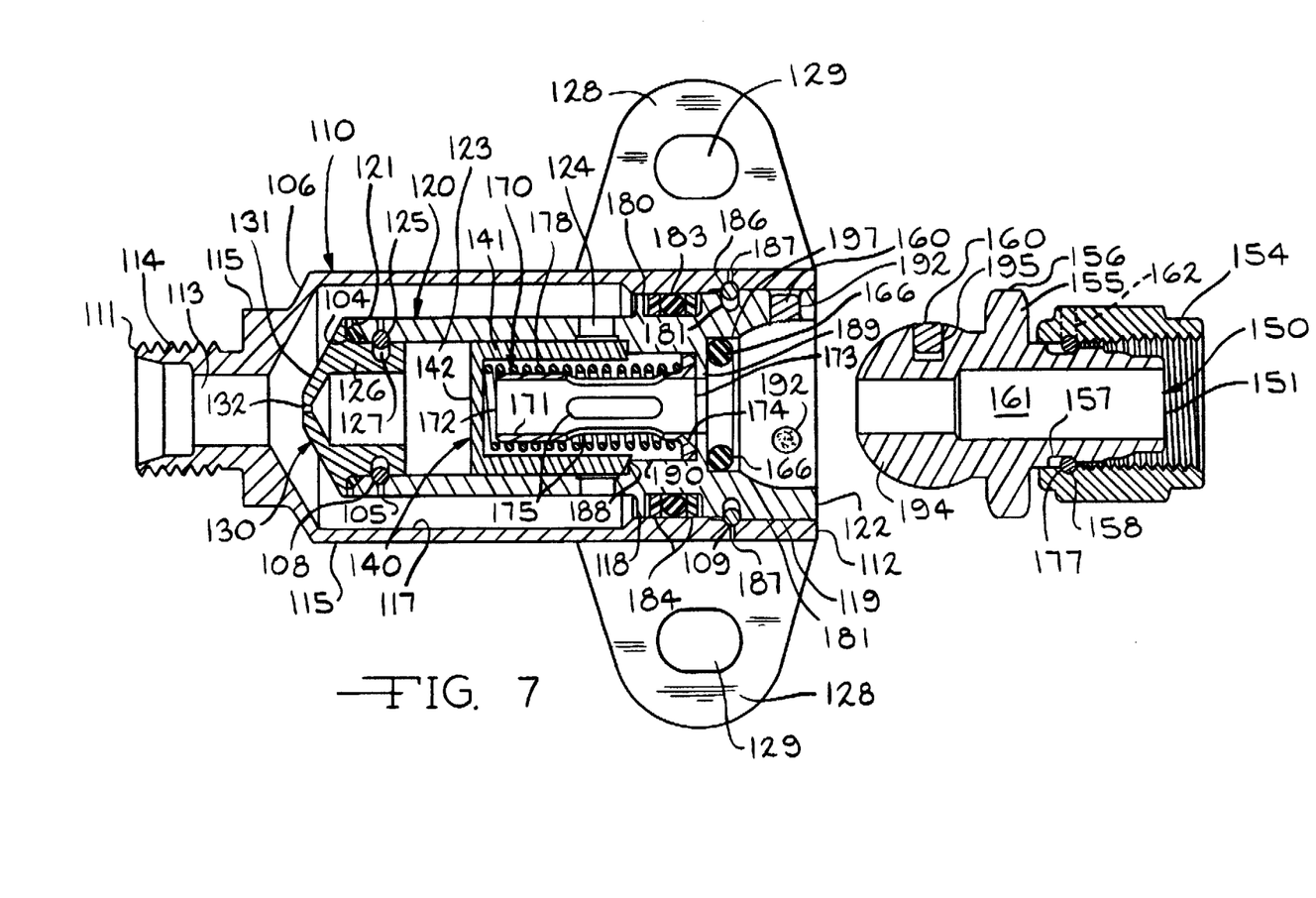
FIG. 7 is a sectional view of the alternate embodiment of FIG. 6 in the fully closed position following separation of the fitting upon breakage of the fuse pins.

Referring now to the embodiment of FIGS. 6 and 7, the frangible fuse of the modified embodiment includes a body member 110 which extends along an axis A from an inlet end 111 to an outlet end 112 with an axial passageway 113 extending throughout. The inlet end 111 conforms to Military Specification MS 33514-6 and includes external threads 114 for engaging the body member to a hydraulic fluid flow line (not shown) such as that utilized in an airplane. The body member 110 includes an exterior cylindrical surface section 115 extending from the outlet end 112 toward externally threaded section 114. A section having a series of flats 116 defining a hexagon is positioned between the inlet end 111 and the exterior cylindrical surface section 115 and is joined thereto by a tapering wall portion 106.

Internally, the body member 110 includes a first inwardly facing cylindrical surface 117 defining a portion of the passageway 113, a smaller second inwardly facing cylindrical surface 118 and a third inwardly facing cylindrical surface 119 which is very slightly larger in diameter than the second inwardly facing cylindrical surface 118 but smaller in diameter than the first inwardly facing cylindrical surface 117. An annular groove 109 extends outwardly from the third inwardly facing cylindrical surface 119.

The body member 110 has a pair of integrally formed ears 128 each having an elongated aperture 129 for receiving a screw, rivet or other means for securely fastening the body member 110 to a structural member of the aircraft.

A sleeve 120 is positioned in the body member 110 and extends from a forward end 121 axially aligned with and spaced from the first inwardly facing cylindrical surface 117 to a rearward end 122 axially aligned with the outlet end 112 of body member 110. The sleeve 120 includes an axial passageway 123 which extends from the forward end 121 to the rearward end 122 and a plurality, preferably four, of metering holes 124 extending radially outwardly in an area approximately midway axially between the forward end 121 and rearward end 122 to the portion of the body member passageway 113 adjacent the first inwardly facing cylindrical surface 117. For the −6 size, the metering holes will each have a diameter of the order of 0.156 inch. The sleeve 120 is provided with an inwardly facing groove 125 spaced from the forward end 121.

A plug 130 is engaged to the forward end 121 of the sleeve 120. The plug 130 has a cylindrical wall 126 positioned in the forward end 121 of sleeve 120 and an end wall 131 tapering at an angle defining a frustum of a cone. An axially positioned communication port 132 defining an opening on the order of 0.030 inch extends through the end wall 131. The end wall 131 extends outwardly radially beyond the cylindrical wall 126.

The plug cylindrical wall 126 has an outwardly facing annular groove 127 positioned to be axially aligned with the groove 125. The groove 127 has a depth significantly greater than the depth of groove 125. A split metal ring 108 is positioned in the annular groove 127 of the plug cylindrical wall 126. The split metal ring 108 is formed from stock having a diameter greater than the depth of the groove 125 but less than the depth of the groove 127. The ring 108 itself, when in an unstressed condition has an outside diameter which is larger and an inside diameter which is smaller than the outside diameter of the plug cylindrical wall 126. When the plug 130 is inserted into the forward end 121 of the sleeve 120, the ring 108 is constricted such that its outside diameter is the same as the inside diameter of the sleeve 120. The sleeve 120 is provided with a chamfer 107 between the forward end 121 and the inner surface which provides a tapered surface against which the outer diameter of the ring 108 slides as the plug 130 is inserted. When the plug 130 is fully inserted in the sleeve 120, with the outer portion of the end wall 131 in close proximity to the forward end 121 of the sleeve 120, the annular groove 127 will become axially aligned with the groove 125 thereby permitting the split ring 108 to resiliently snap outwardly into the groove 125 and thereby locking the plug 130 to the sleeve 120. If desired, a plurality of apertures 105, preferably four, may extend through the wall of the sleeve 120 to communicate with the groove 125. Such apertures 105 permit a tool to be inserted to compress the ring 108 if it is desired to release the plug 130 from the sleeve 120.

An annular seal 104 is positioned on the cylindrical wall 126 prior to the insertion of the plug 130 in the sleeve 120 and provides a seal between the chamfer 107 and the outer portion of the end wall 131.

Downstream from the metering holes 124, the sleeve 120 has a first enlarged outer wall section 180 sized to be positioned in the body member 110 in sliding engagement with the second inwardly facing wall surface 118 and a second slightly larger outwardly facing wall section 181 sized to be in sliding engagement with the third inwardly facing cylindrical wall surface 119. An outwardly facing annular groove 182 is formed in the first enlarged outer wall section 180 and has positioned therein an annular seal 183 and a pair of rigid annular retainers 184, one on each side of the annular seal 183. The outer diameter of the annular seal 183 is such that it can readily pass through the third inwardly facing cylindrical wall surface 119 as the sleeve 120 is inserted into the body member 110 without damaging it and is sized such that it will sealingly engage the second inwardly facing cylindrical wall surface 118. The retainers 184 are sized to be readily received in the second inwardly facing wall surface 118, either in contact therewith or closely spaced therefrom.

An outwardly facing annular groove 185 is formed in the second enlarged outwardly facing wall section 181 in a position to be axially aligned with the groove 109 of the second inwardly facing cylindrical wall surface 119 of the body member. A split ring 186 similar to the split ring 108 of the plug 130 and sleeve 120 is provided for securing the sleeve 120 in engagement with the body member 110. If desired a plurality access apertures 187, preferably four, may be formed in the body member 110 to communicate with the annular groove 109 to provide access means for a tool for use in compressing the split ring 186 in order to remove the sleeve 120 from the body 110.

Internally, the sleeve 120 is provided with a first inwardly extending shoulder 188 slightly downstream from the metering holes 124 and a flange 189 axially spaced from the shoulder 188 and extending radially inwardly from a cylindrical wall portion 190 extending between the shoulder 188 and the flange 189. The sleeve 120 is further provided with an inwardly facing spherical section 191 in an area between the rearward end 122 and the flange 189. Between the flange 189 and the spherical section 191 is a cylindrical wall section 197. An annular seal 166 is positioned against the flange 189 and is sized to snugly engage the cylindrical wall section 197.

A plurality of apertures 192, preferably three, extend radially inwardly from the outer portion of the second enlarged outwardly facing wall section 181 to the spherical section 191 in an axially area slightly spaced from the rearward end 122.

Positioned in the rearward end 122 of the sleeve 120, in engagement with the spherical section 191, is a fitting 150 having a spherical ball portion 194 engaged to the spherical section 191 of the sleeve 120 and sealingly engaged to the annular seal 166. The spherical ball portion 194 is provided with a plurality of cavities 195 equal in number to and aligned with the apertures 192 of the sleeve 120. Frangible fuse pins 160 similar to the fuse pins 60 of the embodiment of FIGS. 1–5 are positioned in each of the apertures 192 and extend into each of the respective aligned cavities 195 and serve to retain the fitting 150 to the sleeve 120 during normal operation of the hydraulic system.

The fitting 150 extends from the spherical ball portion 194 to an outlet end 151. A passageway 161 extends through out the length of the fitting from the ball portion 194 to the outlet end 151. An outwardly facing annular groove 157 is formed to the fitting 150 for receiving a drive wire or shear wire 158. The shear wire 158 is intended for use with a nut 154 having an inwardly facing abutment 177 which engages the shear wire 158 and thereby functions to retain the nut 154 engaged to the fitting 150. The nut 154 is provided with a radially extending aperture 162 extending to the groove 157 to provide access means for driving the shear wire into the groove 157 thereby engaging the nut to the fitting 150. A hexagonal shoulder 155 having a series of wrench flats 156 is positioned between the spherical ball section 194 and the groove 157.

Positioned in the portion of the sleeve 120 between the plug 130 and the radial shoulder 188 is a poppet 140. The poppet 140 includes a cylindrical side wall 141 having a size to be slideably engaged to the inwardly facing cylindrical surface of that portion of the sleeve 120 between the plug 130 and the shoulder 188 and a laterally extending end wall 142, the outer portion of which may engage the end of the cylindrical wall 126 of the plug 130. The poppet 140 has an axial length such that, when it is engaged to the end of the plug cylindrical wall 126, it is spaced from the metering holes 124 so that the metering holes are open to the flow of hydraulic fluid. The poppet 140 can slide axially from the normally open position (see FIG. 6) at which the end 142 is engaged to the plug 130 to the closed position (see FIG. 7) at which the cylindrical side wall 141 engages the shoulder 188 thus limiting further movement of the poppet 140 toward the rearward end 122. As can be seen in FIG. 7, when the poppet 140 is in such closed position, the cylindrical side wall 141 overlies the metering holes 124 thereby preventing the flow of hydraulic fluid therethrough.

Positioned within the sleeve 120 is a guide 170 having a generally cylindrical wall 171 which extends from a free end 172 to an abutment end 173 having an outwardly extending flange 174 which is engaged to the flange 189 of the sleeve 120. The guide 170 is provided with a plurality of elongated slots 175 for receiving hydraulic fluid from the metering holes 124 and transmitting it to the passageway 161 of the fitting 150.

Encircling the guide 170 is a compression spring 178. One end of the compression spring 178 rests against the flange 174 of the guide 170 and the other end rests against the wall 142 of the poppet 140 and serves to urge the poppet toward the plug 130 thereby leaving the metering holes 124 open to the flow of hydraulic fluid. The force generated by the compression spring 178 is such that it will be overcome by the pressure differential on the opposite side of the poppet 140 if the fuse pins 160 break thereby releasing the fitting 150 and permitting unrestricted flow of hydraulic fluid through the metering holes 124. Such unrestricted flow of hydraulic fluid creates a pressure differential such that the pressure acting on the side of the end wall 142 facing the plug 130 will be greater than the pressure on the opposite side of such end wall by an amount sufficient to overcome the force of the compression spring 178 thereby causing such poppet 140 to move to the closed position overlying the metering holes 124 with the open end of the cylindrical side wall 141 engaging the shoulder 188. The pressure differential is created by virtue of fluid entering through the communication port 132 of the plug 130. In contrast to the embodiment of FIGS. 1–5, the fuse of the embodiment of FIGS. 6–8 does not release the compression spring 178 upon failure of the fuse pins 160 and separation of the fitting 150 from the body member 110 but rather maintains the compression spring 178 and the guide 170 contained within the sleeve 120 by virtue of the flange 189 of the sleeve 120 retaining the flange 174 of the guide 170.

Figure 8:
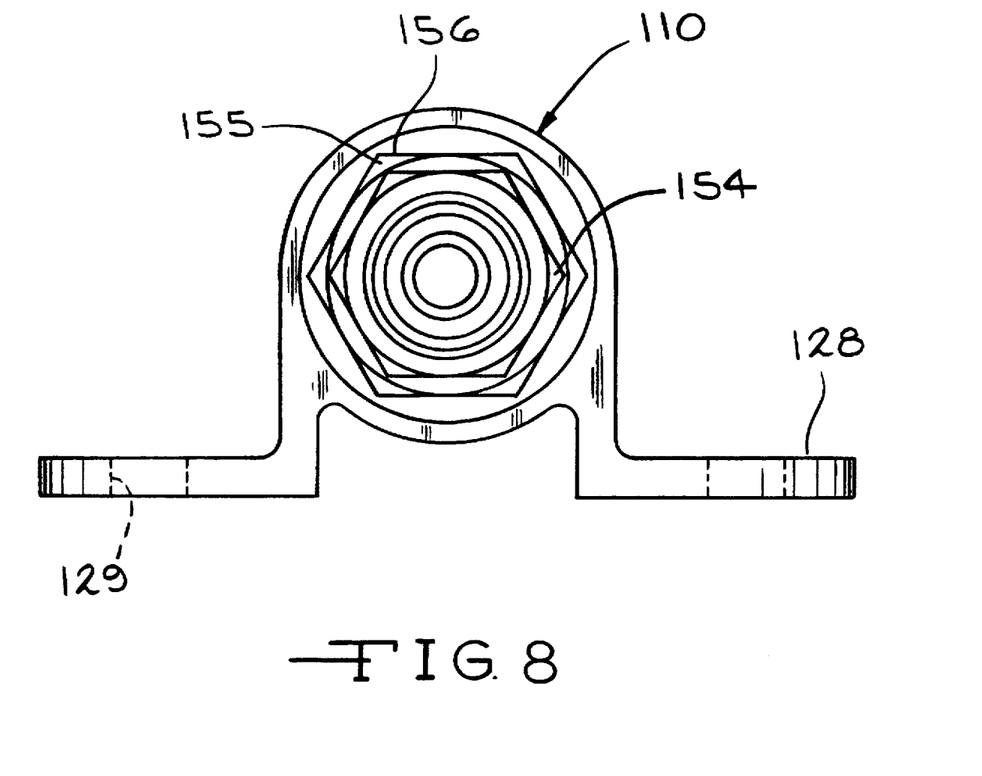
FIG. 8 is an end view of the alternate embodiment of FIG. 6.

A significant advantage of the embodiment of FIGS. 6–8 of the present invention resides in the utilization of a spherical ball portion 194 for the fitting 150. Such spherical ball portion 194 permits the fitting 150 to break cleanly away from the sleeve 120 upon failure of the fuse pins 160 irrespective of whether the rupturing force is in an axial direction or is in a direction at an angle to the axis A as great as 90°. In contrast, in the embodiment of FIGS. 1–5, if the rupturing force causing separation of the fitting 50 from the sleeve 20 is at a significant angle to the axis A, there is a possibility that the twisting of the fitting 50 away from the axis A upon an impact causing such non-axial forces, could cause the fitting 50 to hang-up in the third inwardly facing cylindrical surface 47 of the sleeve 20 thereby preventing clean separation of the fitting 50 from such sleeve 20.

As previously noted, the ears 128 are provided with elongated apertures 129. Such elongated apertures 129 permit body member 110 to be loosely connected to a fixed location of a structural member of an airplane, the tubing of this hydraulic system to be tightly secured to the connector end 164 of the fitting 150 and the body member 110 thereafter to be tightly fastened to such structural member by elements extending through such apertures without placing a pre-load on the frangible fuse pins 160. The apertures 29 of the embodiment of FIGS. 15 could also be elongated.

The prior art fuses which are designed to be activated upon the escape of hydraulic fluid through the damaged hydraulic line are less reliable than the frangible hydraulic fuse of the present invention. This is due, at least in part, to the fact that frequently the broken hydraulic line is not cleanly broken and provides only a restricted opening for the escape of hydraulic fluid. The restricted flow of hydraulic fluid through such restricted opening may be too little to create a pressure drop of a magnitude which will actuate the fuse. In such event, the hydraulic fluid can continue to flow through the restricted opening of the ruptured line depleting the hydraulic system of so much hydraulic fluid as to render that hydraulic system inoperable, potentially causing loss of control.

Many modifications will become readily apparent to those skilled in the art and accordingly, the scope of the present invention should be determined only by the scope of the appended claims.

I claim:

1. A hydraulic fuse comprising:
   (a) a body member extending along an axis from an inlet end to an outlet end and having a passageway extending from said inlet end to said outlet end;
   (b) a sleeve mounted in said body member passageway, said sleeve extending from a first end to an exit end in the vicinity of said outlet end and having (i) a central passage extending to an outlet at said exit end and (ii) at least one radial port between said first end and said exit end for directing the flow of hydraulic fluid from said body member passageway to said central passage;
   (c) a poppet positioned in said sleeve for axial movement in said central passage from a first position spaced from said radial port on the opposite side of said port from said exit end to a second position overlying said radial port;
   (d) a compression spring urging said poppet toward said first position;
   (e) a fitting received in said sleeve, said fitting having a passageway positioned to receive hydraulic fluid from said sleeve; and
   (f) frangible connector members retaining said fitting to said sleeve,
      rupture of said frangible connector members causing release of said fitting and an increase in flow of hydraulic fluid through radial said port, said increase in flow creating a pressure drop downstream from said radial port and a pressure differential on opposite sides of said poppet forcing said poppet to said second position.

2. The hydraulic fuse according to claim 1 further including a transverse wall on said sleeve in the vicinity of said first end, said transverse wall having an aperture which is smaller in size than said port.

3. The hydraulic fuse according to claim 2 wherein said sleeve includes a modular plug engaged to said first end and said transverse wall is part of said plug.

4. The hydraulic fuse according to claim 1 wherein said compression spring is positioned between said poppet and said fitting.

5. The hydraulic fuse according to claim 1 wherein said sleeve has an inwardly extending shoulder positioned axially between said radial port and said exit end and said compression spring is positioned between said poppet and said flange.

6. The hydraulic fuse according to claim 5 further including a guide positioned in said spring, said guide having apertures for receiving fluid entering from said sleeve port and an outwardly extending flange engaged to said shoulder.

7. The hydraulic fuse according to claim 1 wherein said sleeve has a curved engagement surface adjacent said exit end and said fitting has a ball shaped end engaged to said curved engagement surface.

8. The hydraulic fuse according to claim 7 wherein said ball shaped end is provided with cavities and said frangible connector members extend into said cavities.

9. The hydraulic fuse according to claim 7 wherein said sleeve is provided with apertures in the vicinity of said exit end and said ball is provided with cavities aligned with said apertures, said frangible connectors extending through said apertures and into said cavities.

10. The hydraulic fuse according to claim 1 wherein said poppet includes a cylindrical side wall slideably engaged with said sleeve and a transverse wall integral with said side wall.

11. The hydraulic fuse according to claim 10 further including a plug at said sleeve first end, said plug limiting movement of said poppet toward said first end and having an aperture providing communication between said passageway at said inlet end and said poppet transverse wall.

12. The hydraulic fuse according to claim 1 in combination with an airplane and forming part of a hydraulic system of said airplane.

13. The hydraulic fuse according to claim 1 in combination with an airplane and forming part of a hydraulic system of said airplane and further including at least one fastener on said body member for fastening to said airplane.

14. The hydraulic fuse according to claim 13 wherein said fastener is provided with apertures configured to permit engagement of said body member to said airplane and said fitting to said hydraulic system without pre-loading said frangible connector members.

15. In combination
(a) an airplane having wings, structural members and a hydraulic system including tubular members for conveying hydraulic fluid; and
(b) a hydraulic fuse positioned in said hydraulic system, said hydraulic fuse including
  (i) a body member extending along an axis from an inlet end connected to one of said tubular members to an outlet end and having a passageway extending from said inlet end to said outlet end;
  (ii) a sleeve mounted in said body member passageway, said sleeve extending from a first end to an exit end in the vicinity of said outlet end and having (A) a central passage extending to an outlet at said exit end and (B) at least one radial port between said first end and said exit end for directing the flow of hydraulic fluid from said body member passageway to said central passage;
  (iii) a poppet positioned in said sleeve for axial movement in said central passage from a first position spaced from said radial port on the opposite side of said port from said exit end to a second position overlying said radial port;
  (iv) a compression spring urging said poppet toward said first position;
  (v) a fitting having one end received in said sleeve and an opposing end connected to another of said tubular member said fitting having a passageway positioned to receive hydraulic fluid from said sleeve; and
  (vi) frangible connector members retaining said fitting to said sleeve,
    rupture of said frangible connector members causing release of said fitting and an increase in flow of hydraulic fluid through radial said port, said increase in flow creating a pressure drop downstream from said radial port and a pressure differential on opposite sides of said poppet forcing said poppet to said second position.

16. The hydraulic fuse according to claim 15 further including a transverse wall on said sleeve in the vicinity of said first end, said transverse wall having an aperture which is smaller in size than said port.

17. The hydraulic fuse according to claim 16 wherein said sleeve includes a modular plug engaged to said first end and said transverse wall is part of said plug.

18. The hydraulic fuse according to claim 15 wherein said compression spring is positioned between said poppet and said fitting.

19. The hydraulic fuse according to claim 15 wherein said sleeve has an inwardly extending shoulder positioned axially between said radial port and said exit end and said compression spring is positioned between said poppet and said flange.

20. The hydraulic fuse according to claim 19 further including a guide positioned in said spring, said guide having apertures for receiving fluid entering from said sleeve port and an outwardly extending flange engaged to said shoulder.

21. The hydraulic fuse according to claim 15 wherein said sleeve has a curved engagement surface adjacent said exit end and said fitting has a ball shaped end engaged to said curved engagement surface.

22. The hydraulic fuse according to claim 21 wherein said sleeve is provided with apertures in the vicinity of said exit end and said ball is provided with cavities aligned with said apertures, said frangible connectors extending through said apertures and into said cavities.

23. The hydraulic fuse according to claim 15 wherein said poppet includes a cylindrical side wall slideably engaged with said sleeve and a transverse wall integral with said side wall.

24. The hydraulic fuse according to claim 23 further including a plug at said sleeve first end, said plug limiting movement of said poppet toward said first end and having an aperture providing communication between said passageway at said inlet end and said poppet transverse wall.

25. The hydraulic fuse according to claim 15 wherein said body member is provided with unitary extension means for use in securing said body member to one of said structural members, said extension means being provided with an aperture for receiving a fastener connectible to said structural member, said aperture configured to permit engagement of said body member to said structural member and said fitting opposing end to tubular member without pre-loading said frangible connector members.

26. A hydraulic fuse comprising:
(a) a body member extending from an inlet end to an outlet end, and having a passageway extending from said inlet end to said outlet end;
(b) a sleeve mounted in said passageway and extending along an axis from a first end in the vicinity of said body member inlet end to a second end secured to said body member in the vicinity of said outlet end, said sleeve having an outlet in the vicinity of said second end and being spaced from said body member in an area between said first end and said second end and having an inwardly facing cylindrical surface in at least a portion of said area, at least one port extending through said sleeve in said area, (c) a poppet positioned in said sleeve for slidable engagement with said cylindrical surface from an open position spaced from said port to a closed position overlying said port;

(d) a spring yieldingly urging said poppet toward said open position;

(e) a fitting having a central passageway positioned to receive hydraulic fluid from said sleeve outlet; and (f) frangible connectors for maintaining said fitting engaged to said sleeve, rupture of said frangible connectors permitting said fitting to disengage from said sleeve and permitting hydraulic fluid to flow unrestrictedly through said sleeve outlet, said unrestricted flow creating a pressure drop causing said poppet to move axially in said sleeve to said closed position.

27. The hydraulic fuse according to claim 26 wherein said sleeve first end is provided with a generally transverse wall having an aperture permitting a build-up of pressure on the side of said poppet which will urge said poppet toward said closed position.

28. The hydraulic fuse according to claim 26 wherein said sleeve is provided with an inwardly extending shoulder between said port and said second end providing support against the urging action of said spring.

29. The hydraulic fuse according to claim 26 further including a guide encircled by said spring, said guide having apertures for receiving fluid entering from said sleeve port.

30. The hydraulic fuse according to claim 26 wherein said sleeve second end has a curved engagement surface and said fitting has a ball shaped end engaged to said curved engagement surface.

31. The hydraulic fuse according to claim 30 wherein said ball shaped end is provided with cavities and said frangible connectors extend into said cavities.

32. The hydraulic fuse according to claim 30 wherein said sleeve is provided with apertures in the vicinity of said second end and said ball is provided with cavities aligned with said apertures, said frangible connectors extending through said apertures and into said cavities.

33. The hydraulic fuse according to claim 30 further including an annular seal between said ball-shaped end and said sleeve.

34. The hydraulic fuse according to claim 26 wherein said sleeve includes a plug at said first end, said plug limiting movement of said poppet toward said first end and having an aperture providing communication between passageway at said inlet end and said poppet.

* * * * *